(12) United States Patent
Lee et al.

(10) Patent No.: US 10,185,408 B2
(45) Date of Patent: Jan. 22, 2019

(54) METHOD AND SYSTEM FOR INPUTTING IN ELECTRONIC DEVICE WITH A TOUCH INPUT AND A PROXIMITY INPUT

(71) Applicant: Samsung Electronics Co., Ltd., Suwon-si, Gyeonggi-do (KR)

(72) Inventors: Jaehak Lee, Gumi-si (KR); Dooyong Park, Gumi-si (KR); Younggyun Lee, Gumi-si (KR); Minho Kim, Gumi-si (KR); Gyucheol Choi, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/474,813

(22) Filed: Sep. 2, 2014

(65) Prior Publication Data

US 2015/0070332 A1    Mar. 12, 2015

(30) Foreign Application Priority Data

Sep. 10, 2013   (KR) .................. 10-2013-0108276

(51) Int. Cl.
*G06F 3/0354* (2013.01)
*G06F 3/041* (2006.01)
*G06F 3/0488* (2013.01)

(52) U.S. Cl.
CPC ........ *G06F 3/03545* (2013.01); *G06F 3/0418* (2013.01); *G06F 3/04883* (2013.01)

(58) Field of Classification Search
CPC . G06F 3/03545; G06F 3/0418; G06F 3/04883
See application file for complete search history.

(56) References Cited

U.S. PATENT DOCUMENTS

| | | | | |
|---|---|---|---|---|
| 6,603,463 B1 * | 8/2003 | Rising, III | ............ | G06F 3/0338 345/156 |
| 8,493,340 B2 * | 7/2013 | Tremblay | ............ | G06F 3/03545 178/18.06 |
| 8,854,342 B2 * | 10/2014 | DiVerdi | ................ | G06F 3/0488 178/19.01 |
| 8,896,579 B2 * | 11/2014 | DiVerdi | ................ | G06F 3/0488 178/19.01 |
| 8,952,939 B2 * | 2/2015 | Lee | ........................ | B44F 11/02 345/179 |
| 8,994,698 B2 * | 3/2015 | DiVerdi | .............. | G06F 3/03545 178/19.01 |

(Continued)

FOREIGN PATENT DOCUMENTS

| | | |
|---|---|---|
| CN | 1711517 A | 12/2005 |
| CN | 102193623 A | 9/2011 |
| CN | 102375604 A | 3/2012 |

*Primary Examiner* — Peter D McLoone
(74) *Attorney, Agent, or Firm* — Jefferson IP Law, LLP

(57) ABSTRACT

A method and a system for inputting in an electronic device are provided. The method includes receiving a proximity input provided by an input tool through a user interface, the input tool having a drawing means with a predetermined length which is within a distance of a proximity input supporting section of the electronic device, identifying an attribute of the received proximity input, determining a display attribute based on the identified attribute of the proximity input, and outputting a drawing on the user interface corresponding to the determined display attribute and a drawing pattern of the proximity input.

23 Claims, 8 Drawing Sheets

(56) References Cited

U.S. PATENT DOCUMENTS

| | | | |
|---|---|---|---|
| 9,030,464 B2* | 5/2015 | Baxter, III | G06T 11/001 345/419 |
| 9,075,464 B2* | 7/2015 | Mankowski | G06F 3/041 |
| 2002/0085003 A1* | 7/2002 | Nagashima | G06T 11/001 345/441 |
| 2003/0214491 A1* | 11/2003 | Keely | G06F 3/0481 345/179 |
| 2005/0270269 A1 | 12/2005 | Tokkonen | |
| 2006/0026521 A1 | 2/2006 | Hotelling et al. | |
| 2010/0181121 A1* | 7/2010 | Tremblay | G06F 3/038 178/19.01 |
| 2010/0182284 A1* | 7/2010 | Tremblay | G06F 3/038 345/179 |
| 2010/0182285 A1* | 7/2010 | Tremblay | G06F 3/038 345/179 |
| 2011/0225628 A1 | 9/2011 | Hirose | |
| 2011/0251829 A1* | 10/2011 | Baxter, III | G06T 11/001 703/1 |
| 2012/0038586 A1 | 2/2012 | Han et al. | |
| 2012/0098798 A1* | 4/2012 | Lee | B44F 11/02 345/179 |
| 2013/0009907 A1* | 1/2013 | Rosenberg | G06F 3/046 345/174 |
| 2013/0229389 A1* | 9/2013 | DiVerdi | G06F 3/03545 345/179 |
| 2013/0229390 A1* | 9/2013 | DiVerdi | G06F 3/0488 345/179 |
| 2013/0229391 A1* | 9/2013 | DiVerdi | G06F 3/0488 345/179 |
| 2014/0081610 A1* | 3/2014 | DiVerdi | G06F 3/01 703/6 |
| 2014/0210730 A1* | 7/2014 | Mankowski | G06F 3/041 345/173 |
| 2015/0153852 A1* | 6/2015 | DiVerdi | G06F 3/03545 345/179 |
| 2015/0234528 A1* | 8/2015 | Choi | G06F 3/0416 715/716 |
| 2015/0253908 A1* | 9/2015 | Go | G06F 3/0488 345/173 |
| 2015/0286298 A1* | 10/2015 | Lee | G06F 3/03545 345/179 |

\* cited by examiner

METHOD AND SYSTEM FOR INPUTTING IN ELECTRONIC DEVICE WITH A TOUCH INPUT AND A PROXIMITY INPUT

CROSS-REFERENCE TO RELATED APPLICATION(S)

This application claims the benefit under 35 U.S.C. § 119(a) of a Korean patent application filed on Sep. 10, 2013 in the Korean Intellectual Property Office and assigned Serial number 10-2013-0108276, the entire disclosure of which is hereby incorporated by reference.

TECHNICAL FIELD

The present disclosure relates to a method and a system for inputting in an electronic device, in which an intuitive and realistic drawing is provided through a user interface.

BACKGROUND

As smart phones are widely used, interfacing technologies between a user and an electronic device (i.e., a technology of which an electronic device identifies various user inputs and provides various outputs according to the result of the identification) are gradually developing.

In particular, by using an input means such as a pen on a user interface such as a touchscreen, a user input can be provided for the electronic device so the user may conveniently and intuitively take notes.

Also, various drawing inputs can be provided for the electronic device by using a touch pen, and the electronic device can output a drawing onto the touch screen corresponding to the drawing inputs.

Although an intuitive drawing input can be provided for the electronic device by using a currently available touch pen, there is a limit to providing a realistic drawing experience similar to drawing on paper with a brush.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and a system for inputting in an electronic device, which provides a realistic drawing experience similar to using a real drawing tool when drawing with an electronic device.

In accordance with an aspect of the present disclosure, a method for inputting in an electronic device is provided. The method includes receiving a proximity input provided by an input tool through a user interface, the input tool having a drawing means with a predetermined length which is within a distance of a proximity input supporting section of the electronic device, identifying an attribute of the received proximity input, determining a display attribute based on the identified attribute of the proximity input, and outputting a drawing on the user interface corresponding to the determined display attribute and a drawing pattern of the proximity input.

In accordance with another aspect of the present disclosure, a system for inputting in an electronic device is provided. The system includes an input tool comprising a proximity input responder and a drawing means with a predetermined length which is within a distance of a proximity input supporting section of the electronic device, and the electronic device comprising a user interface, and a control unit configured to receive a proximity input provided by the input tool through the user interface, to identify an attribute of the received proximity input, to determine a display attribute based on the identified attribute of the, and to output a drawing to the user interface corresponding to the determined display attribute and a drawing pattern of the proximity input.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

Figure 1:
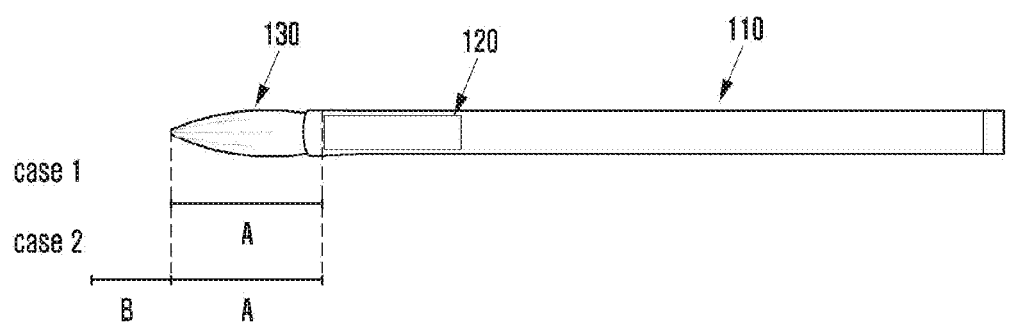
FIG. 1 is a schematic drawing illustrating an input tool for an input system of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reasons, some components in the accompanying drawings are emphasized, omitted, or schematically illustrated, and the size of each component does not fully reflect the actual size. Therefore, the present disclosure is not limited to the relative sizes and distances illustrated in the accompanying drawings.

It is to be understood that the singular forms "a", "an", and "the" include plural referents unless the context clearly dictates otherwise. Further, it should not be understood that the term "comprise" or "include" doesn't mean to include all the items or operations listed in the disclosure.

Hereinafter, an input tool of an electronic device described in the present disclosure and the accompanying drawings means a system designed to provide a drawing output through a user interface of the electronic device, if the drawing is provided for the user interface of the electronic device by using an input tool.

Further, the user interface of the electronic device illustrated in the drawings of the present disclosure is a device for receiving a user input and outputting to the user. In particular, the user interface may include an input detection sensor for detecting the user input, to which various detection technologies such as a resistive type, a capacitive type, an electromagnetic induction type, and a pressure type can be applied.

The electronic device according to the present disclosure can detect not only the touch input through an input means such as an input tool but also a proximity input formed within a predetermined distance.

The input system of an electronic device according to various embodiments of the present disclosure includes an input tool and an electronic device.

FIG. 1 is a schematic drawing illustrating an input tool for an input system of an electronic device according to an embodiment of the present disclosure.

The input system of an electronic device according to various embodiments of the present disclosure can provide a drawing through a proximity input performed by an input tool. The input tool includes an input responder, and an input detection sensor included in a user interface of the electronic device detects an input according to the input responder of the input tool.

For example, the input detection sensor of the user interface can detect a touch input and a proximity input according to an actual contact or a distance to the input responder of the input tool. If an electromagnetic sensor is included as an input detection sensor of the user interface, a resonance screen inducing an electromagnetic field may be used for the electromagnetic sensor.

The electronic device according to various embodiments of the present disclosure can provide a drawing input by receiving a proximity input from the input tool. Namely, a more practical drawing input can be provided on the user interface according to various attributes of the proximity input.

Referring to FIG. 1, an input tool 100 according to various embodiments of the present disclosure includes a drawing means 130 in a proximity input supporting section to support a practical drawing input. For example, the drawing means 130 may be a brush or another similar and/or suitable drawing device. Accordingly, a user can input a drawing into the electronic device through a proximity input by putting the drawing means 130 into contact with the user interface of the electronic device like using an actual drawing tool.

In more detail, the input tool 100 may include a body 110 which is used as a supporting bar for a user, input responder 120 for inducing an input on the electronic device, and drawing means 130. The drawing means 130 may be attached to an end of the input responder 120 because it must be located in the proximity input supporting section.

In the meantime, the length of the drawing means 130 of the input tool 100 may be variously set according to an embodiment of the present disclosure.

For example, the length of the drawing means 130 may be formed in the same length as the maximum distance A of a proximity input supported by the input responder 120 as shown by case 1 of FIG. 1. In this case, a drawing input can be provided through the user interface by controlling the drawing means 130 to operate with an actual drawing sense corresponding to the user interface.

Alternatively, the length of the drawing means 130 may be formed shorter than the maximum distance A+B of proximity input supported by the input responder 120 as shown by case 2 of FIG. 1. According to the embodiment, if the input tool 100 is located between section A+B and section A corresponding to the user interface of the electronic device, various information such as a guide for drawing input, location of drawing, shape of drawing means 130, drawing color can be displayed on the user interface of the electronic device. If the input tool 100 contacts with the user interface of the electronic device in the section A, a drawing output corresponding to the drawing input may be displayed on the user interface. Namely, if the drawing means 130 approaches to the user interface, the shape of the drawing means 130 is firstly output to the user interface and the drawing can start from the moment of touching the user interface.

The present disclosure is not limited to the above description and a guide or drawing function can be applied to various embodiments by setting different sections according to the distance in the proximity input supporting section.

Figure 2:
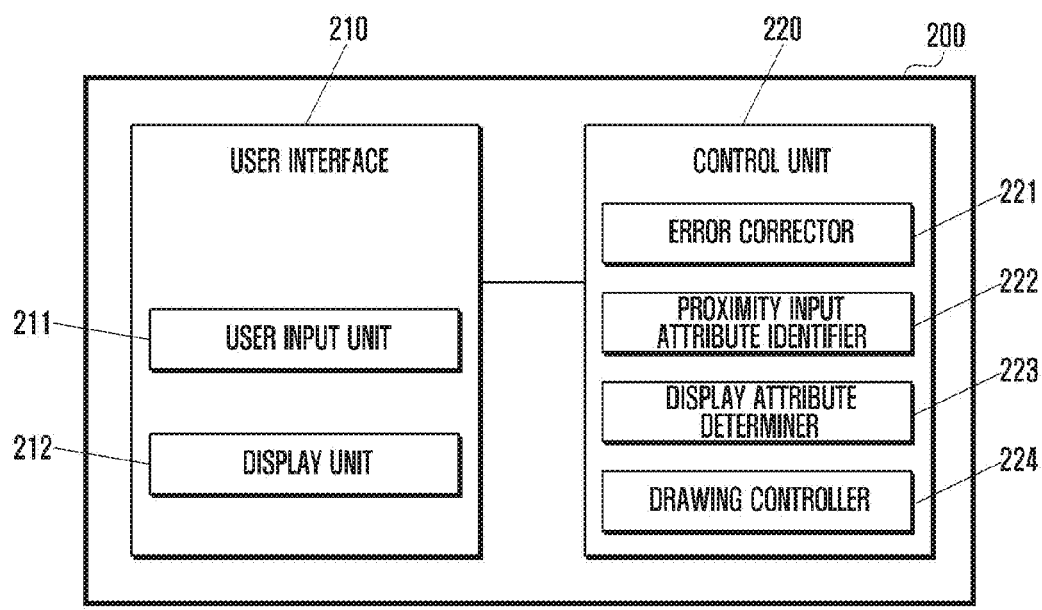
FIG. 2 is a block diagram illustrating a configuration of an input system for an electronic device according to an embodiment of the present disclosure.

FIG. 2 is a block diagram illustrating a configuration of an input system for an electronic device according to an embodiment of the present disclosure.

Referring to FIGS. 1 and 2, an electronic device 200 is configured to receive a drawing input from the input tool 100 and may include a user interface unit 210 and a control unit 220.

The user interface unit 210 receives a user input, and performs a function of outputting contents provided by the electronic device for a user. For example, the user interface unit 210 may be configured with a touch screen performing both an input function and a display function. In more detail, the user interface unit 210 may include a user input unit 211 and a display unit 212.

The user input unit 211 is a device for receiving a user input, and may include an input detection sensor to detect the user input. Various input detection technologies such as a resistive type, a capacitive type, an electromagnetic induction type, and a pressure type can be applied to the input detection sensor. The user input unit 211 can detect not only the direct touch input through an input means such as an input tool but also a proximity input formed within a predetermined distance.

In more detail, the user input unit 211 can detect a proximity input through the input responder 120 of the input tool 100. The proximity input can be a drawing input. The user input unit 211 transmits a received proximity input (for example, a drawing input) to the control unit 220.

The display unit 212 is a device for displaying output information in the electronic device, and may include a display panel. In more detail, the display unit 212 can output a drawing corresponding to an input through the user input unit 211 under the control of the control unit 220.

The control unit 220 controls general operations of the electronic device 200. The control unit 220 can decide an attribute of a drawing to be output to the display unit 212 by identifying an attribute of a proximity input received from the user input unit 211. The attribute of the proximity input denotes an attribute for providing an actual drawing sense for the user interface unit 210 by using the input tool 100 of the electronic device 200. Namely, a specific shape of drawing is formed according to various factors when actually drawing on a paper with a brush, and the control unit 220 according to various embodiments of the present disclosure identifies the specific shape of drawing from the attribute of the proximity input in order to control the drawing output similar to the actual drawing.

In more detail, the control unit 220 may include an error corrector 221, proximity input attribute identifier 222, display attribute determiner 223, and drawing control unit 224.

The error corrector 221 performs a function of correcting a drawing output error which can be generated when the input tool 100 is inclined and a proximity input area received by the input responder 120 on the user interface unit 210 becomes different from a contact area of the drawing means 130.

Figure 3:
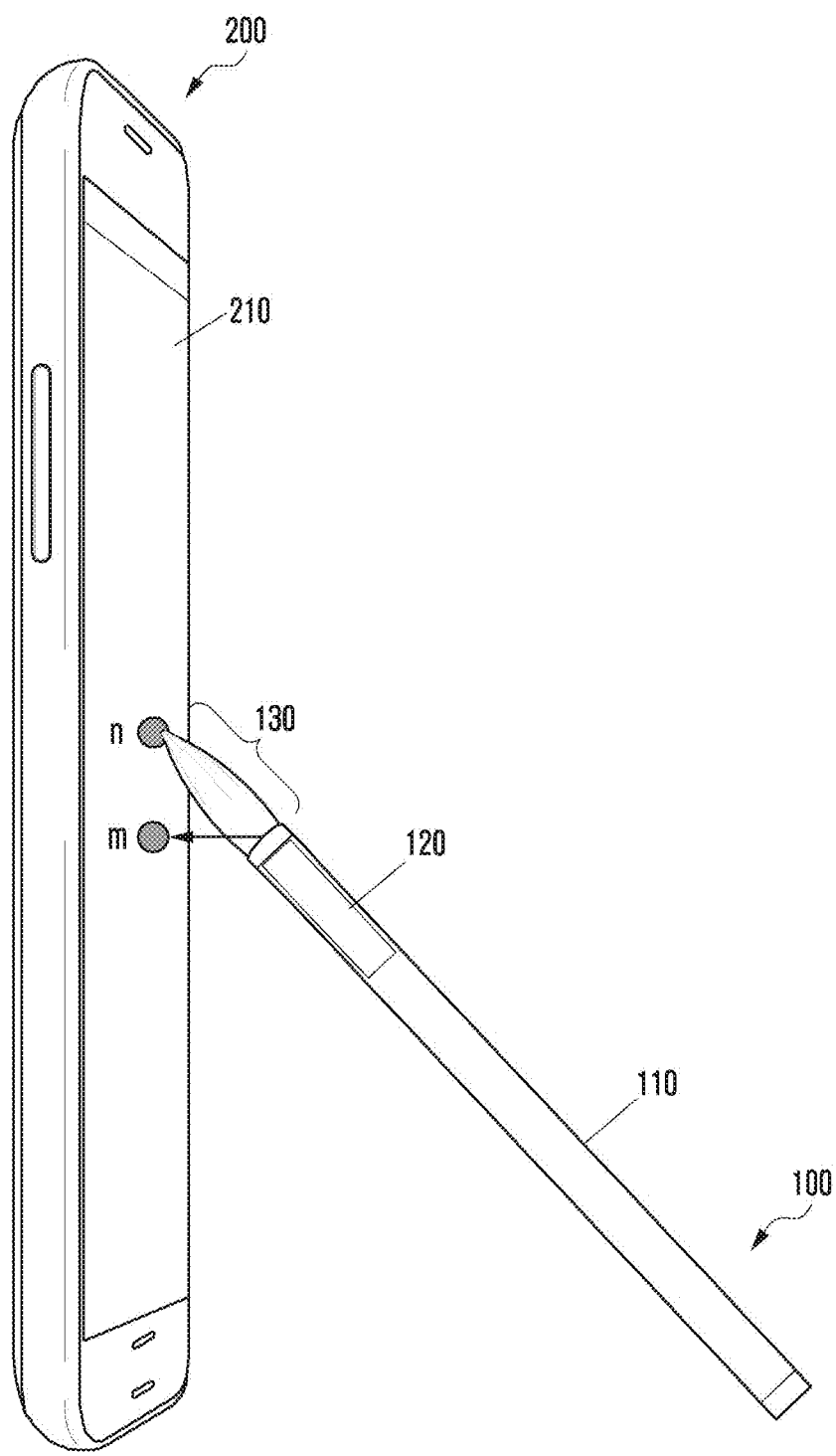
FIG. 3 is a drawing illustrating an example of operating an error corrector for an input system of electronic device according to an embodiment of the present disclosure.

FIG. 3 is a drawing illustrating an example of operating an error corrector for an input system of electronic device according to an embodiment of the present disclosure.

Referring to FIG. 3, when the input tool 100 performs an input function on the electronic device 200 in an specific inclined state, a proximity input generated by the input responder 120 on the user interface unit 210 is detected from area m, however the drawing means 130 actually contacts area n. Accordingly, a user makes a drawing by estimating the area n, however a deviation can be generated because the drawing output of area m is displayed on the user interface unit 210. If the difference between the area m and area n becomes greater than a critical value, a drawing output can be displayed out of an area intended by the user.

The error corrector 221 corrects an error so that a drawing output can be displayed in the contact area of the drawing means 130. In more detail, the error corrector 221 identifies an additional touch input of the drawing means 130, and replaces the location of drawing output with the location of identified touch input. For this, the drawing means 130 of the input tool 100 must additionally include a touch responding material. Namely, the input tool 100 and the electronic device 200 according to the embodiment of the present disclosure can identify not only the proximity input but also a touch input. In the meantime, in order to avoid an unnecessary touch input such as a palm touch generated in the electronic device 200, the error corrector 221 can identify only the touch input generated in a predetermined area based on the proximity input.

As another embodiment, the error corrector 221 can correct the drawing location by detecting the inclination of the input tool 100. Namely, the correction of the drawing location can be performed by saving deviations of a drawing location corresponding to the inclinations of the input tool 100 and compensating with a corresponding deviation value when the input tool 100 is inclined.

The proximity input attribute identifier 222 identifies an attribute of a proximity input generated by the user interface unit 210. The attribute of the proximity input may include at least one of a proximity distance, a movement speed, an input duration time, a movement direction, a number of inputs, a standstill time of the proximity input, a state of input tool, a type of drawing means of the input tool, surface material set to the user interface, and any other similar and/or suitable attribute. A drawing is generated according to various factors when actually drawing on a paper with a brush, and the attribute of the proximity input is also influenced by various factors. Because the attribute of the proximity input changes every moment, the proximity input attribute identifier 222 identifies the attribute of the proximity input in real time.

The display attribute determiner 223 determines the characteristics of drawing output to be provided for the user interface unit 210 based on the attribute of proximity input identified by the proximity input attribute identifier 222. Alternatively, the display attribute determiner 223 may determine the display attribute by tuning the attribute of the proximity input identified by the proximity input attribute identifier 222 with a value modeled on an actual drawing means.

For example, if the attribute of proximity distance is relatively short, the display attribute determiner 223 may increase the thickness attribute of a drawing to be output. The determined display attribute may include at least one of a thickness of drawing, a dry brush effect, a concentration, a color, and any other similar and/or suitable attribute.

Figure 4:
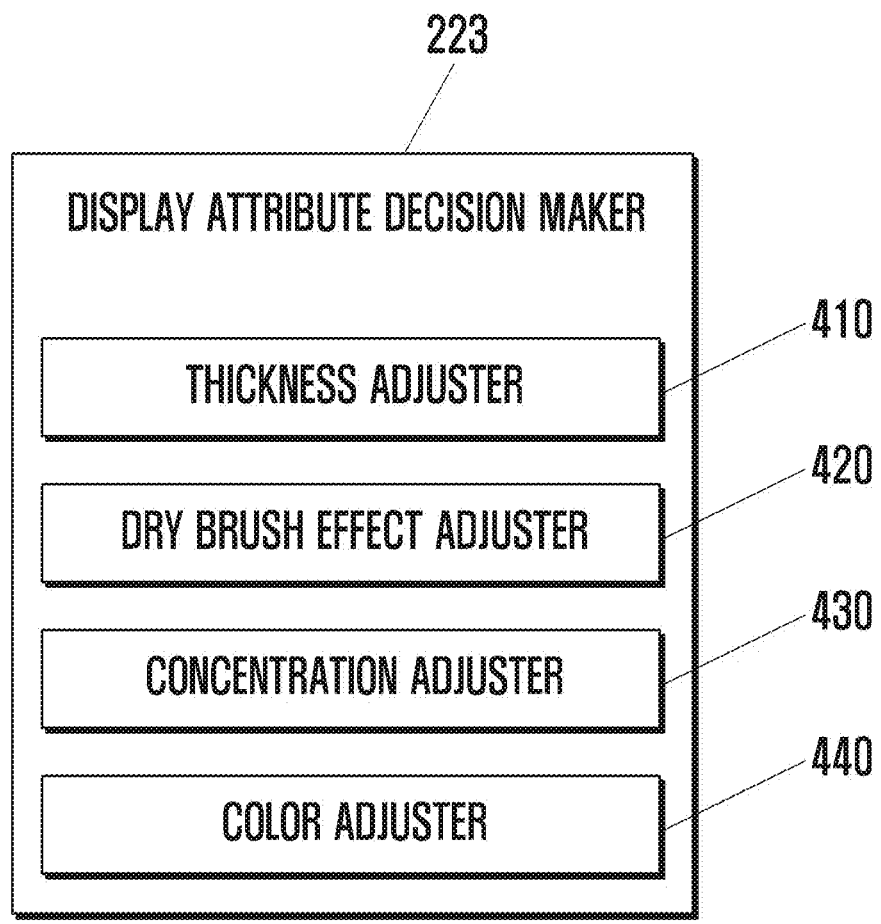
FIG. 4 is a block diagram illustrating a configuration of a proximity input attribute identifier according to an embodiment of the present disclosure.

FIG. 4 is a block diagram illustrating a configuration of a proximity input attribute identifier according to an embodiment of the present disclosure.

Figure 5:
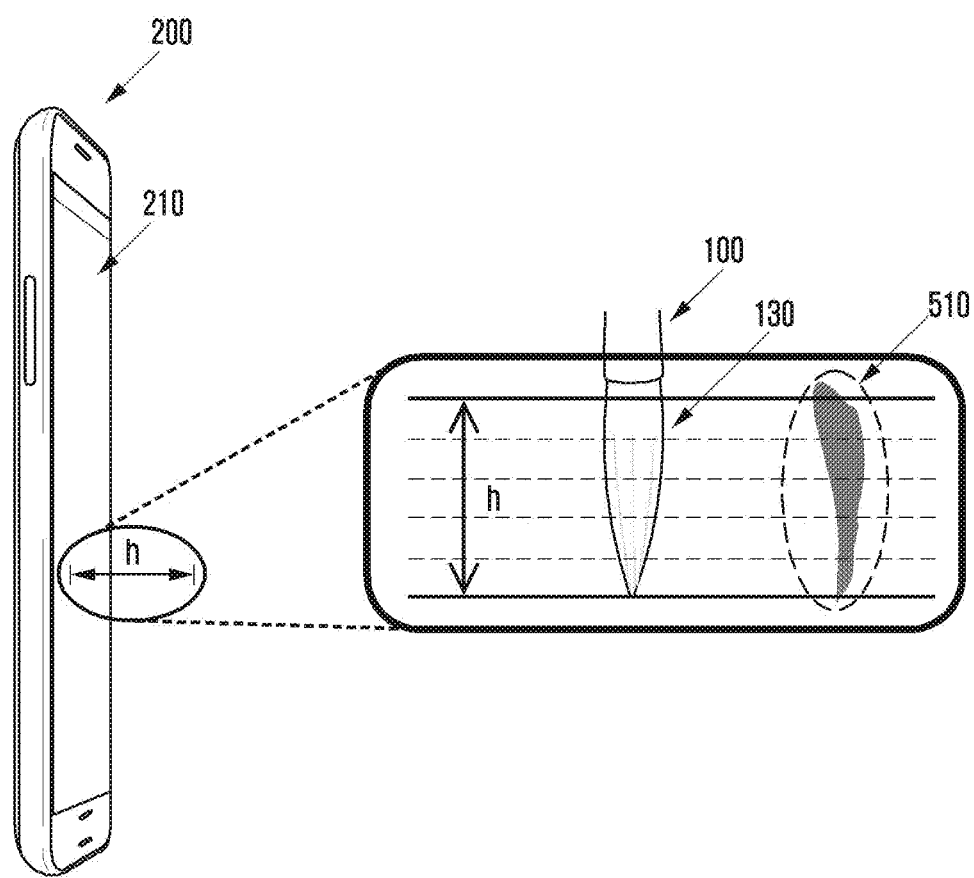
FIG. 5 is a drawing illustrating an example of operating a thickness adjuster for an input system of an electronic device according to an embodiment of the present disclosure.

FIG. 5 is a drawing illustrating an example of operating a thickness adjuster for an input system of an electronic device according to an embodiment of the present disclosure.

Figure 6A:
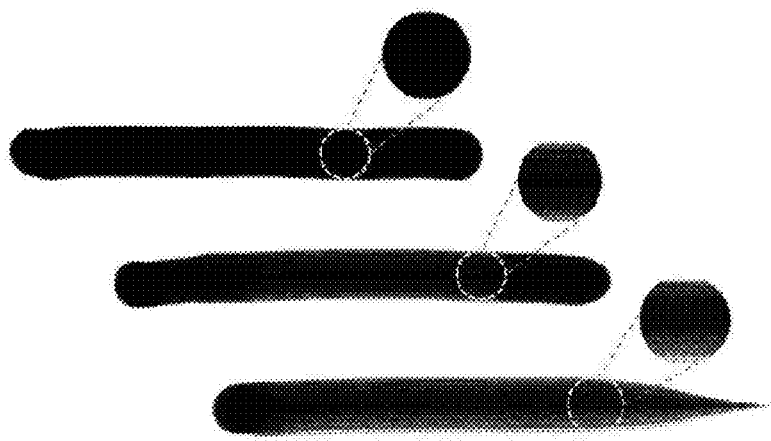
FIGS. 6A, 6B, and 6C are drawings illustrating an example of drawing lines by using a dry brush effect adjuster according to an embodiment of the present disclosure.
Figure 6B:
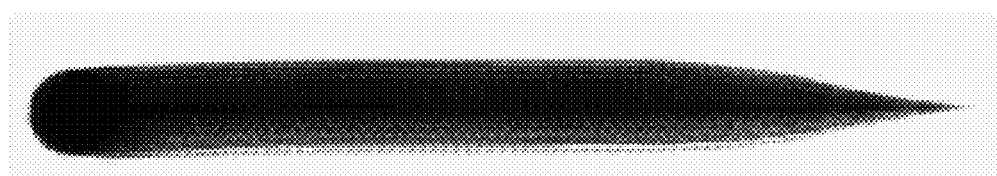
Figure 6C:
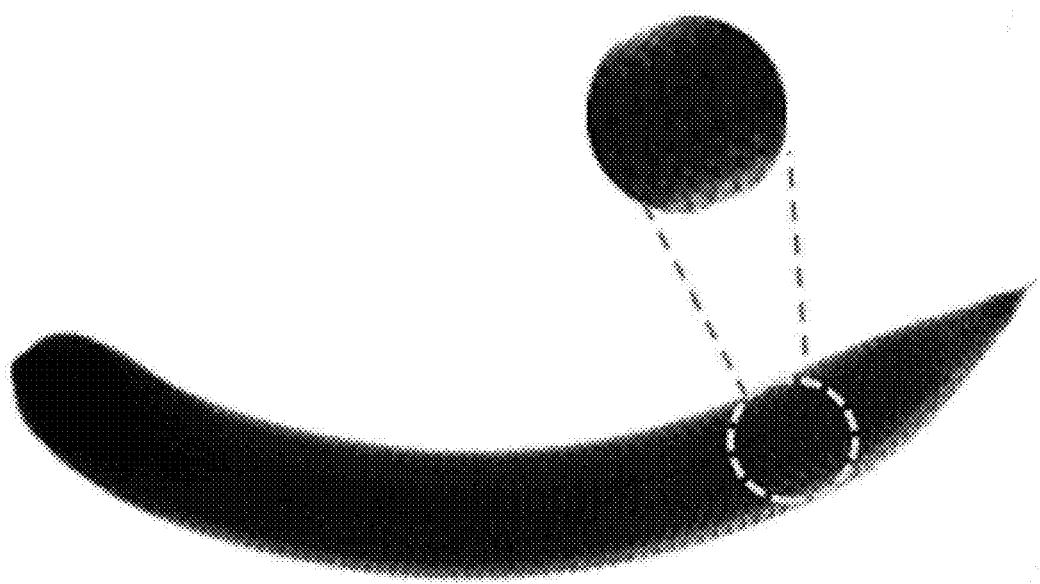

FIGS. 6A, 6B, and 6C are drawings illustrating an example of drawing lines by using a dry brush effect adjuster according to an embodiment of the present disclosure.

Referring to FIG. 4, the display attribute determiner 223 may include a thickness adjuster 410, a dry brush effect adjuster 420, a concentration adjuster 430, and a color adjuster 440.

The thickness adjuster 410 adjusts the thickness of a drawing to be output based on the distance of the proximity input identified by the proximity input attribute identifier 222 or the type of the drawing means 130 according to a user setting. For example, the thickness adjuster 410 may control the thickness of drawing nonlinearly as the distance of the proximity input becomes closer. The thickness of drawing can be adjusted according to the type of the drawing means 130. Further, the thickness of drawing output can be adjusted according to various attributes of the proximity input.

Referring to FIG. 5, the distance attribute of the proximity input changes as the drawing means 130 of the input tool 100 approaches to the user interface unit 210 of the electronic device 200. If the type of the drawing means 130 is a brush and a vertical line is drawn on the user interface unit 210 with a brush, the distance of the proximity input increases gradually. Here, the thickness adjuster 410 may nonlinearly increase the thickness as the distance of the proximity input becomes closer as shown by 510. Namely, the thickness of drawing can be nonlinearly controlled in the same way of drawing with an actual brush. Accordingly, if the distance h between the drawing means 130 of the input tool 100 and the user interface unit 210 increases, the thickness of drawing decreases nonlinearly, and if the distance h decreases, the thickness of drawing increases nonlinearly. Further, the thickness adjuster 410 controls the thickness of drawing by considering various factors, and thereby the thickness of drawing output can be controlled similar to an actual drawing sense.

The dry brush effect adjuster 420 adjusts a dry brush effect of a drawing to be output according to at least one of a movement speed, input duration time, movement direction, and type of drawing means of the proximity input identified by the proximity input attribute identifier 222. For example, the dry brush effect adjuster 420 increases the dry brush effect of outputting the drawing as the movement speed of the proximity input becomes greater. Referring to FIG. 6A, the movement speed of the uppermost line is slowest and the movement speed of the lowermost line is fastest, and thereby the lower line shows greater dry brush effect of drawing.

Further, the dry brush effect adjuster 420 increases the dry brush effect as the time elapses after starting a drawing by identifying the input duration time. As shown in FIG. 6B, if the line is drawn from the left to the right, the dry brush effect of drawing increases as the line moves towards the right direction.

Further, the dry brush effect adjuster 420 can adjust the dry brush effect of the drawing according to the movement direction of the proximity input. As shown by FIG. 6C, if the proximity input moves in a curved form, the dry brush effect of the outer part can be adjusted greater than the inner part.

Further, the dry brush effect adjuster 420 can adjust the dry brush effect of the drawing output according to the type of drawing means 130 and other various attributes of the proximity input.

The concentration adjuster 430 adjusts the concentration or diffusion of a drawing to be output according to at least one of the number of inputs, movement direction, stand still time of the proximity input identified by the proximity input attribute identifier 222, and surface material set to the user interface of the electronic device. For example, the concentration adjuster 430 can control the concentration of the first drawing to be darkest when the drawing means 130 of the input tool 100 virtually picked up a black or color ink, and thereafter controls the concentration of drawing output to be gradually paler.

Further, if the movement direction of the proximity input is distinctly turned, the concentration adjuster 430 can increase the concentration and diffusion of drawing at the turning point. If the stand still time of the proximity input becomes longer, the concentration and diffusion of the drawing can be controlled to increase. Further, the concentration and diffusion of the drawing can be controlled according to the surface material set to the user interface of the electronic device (e.g., type of paper) and various attributes of the proximity input.

The color adjuster 440 adjusts the color of a drawing to be output based on a distance of the proximity input and a state of the input tool 100 identified by the proximity input attribute identifier 222 according to a user setting. If the color adjuster 440 is set to select different colors in every proximity section according to the user setting, the color of drawing output can be adjusted according to the proximity distance of the input tool 100 thereafter. Further, if an activator (not shown) is included in the input tool 100, the color adjuster 440 can adjust the color of outputting drawing based on the activation state of the activator and support a function of adjusting a single color.

Further, the color adjuster 440 provides a function of selecting a color, and thereby can virtually set at least one color to the drawing means 130 of the input tool 100.

Figure 7:
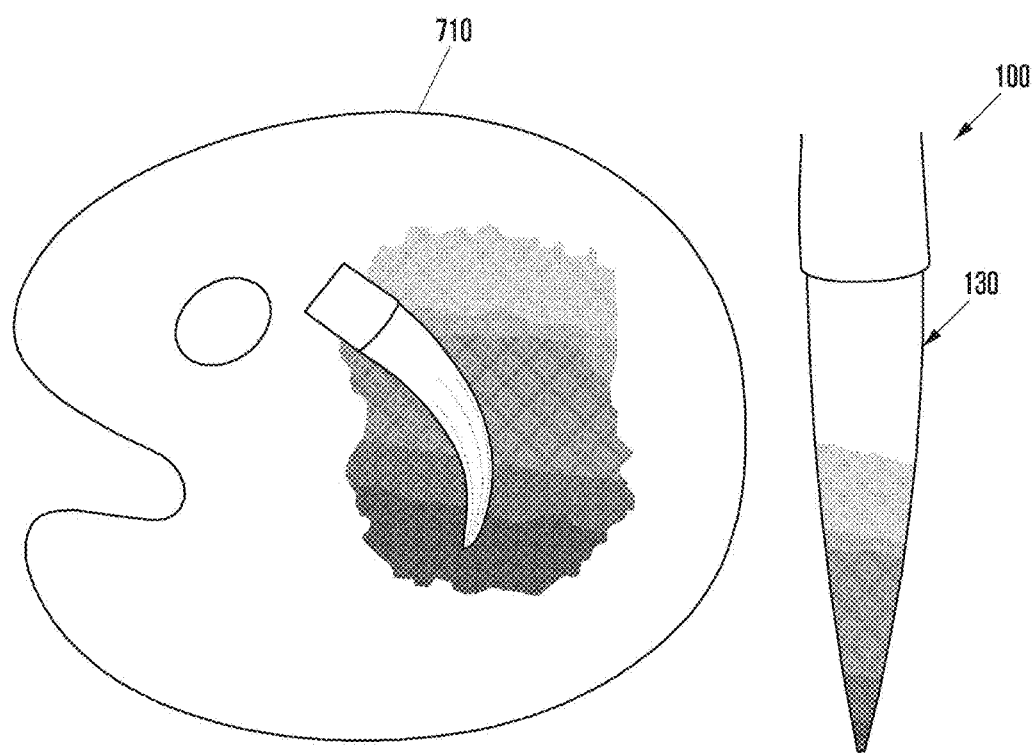
FIG. 7 is a drawing illustrating an example of operating a color adjuster for an input system of an electronic device according to an embodiment of the present disclosure.

FIG. 7 is a drawing illustrating an example of operating a color adjuster for an input system of an electronic device according to an embodiment of the present disclosure.

Referring to FIG. 7, if a pallet 710 including at least one color is provided for the user interface, the color of the input tool 100 can be set by contacting the drawing means 130 of the input tool 100 with the pallet.

Subsequently, if a drawing input is performed according to a colored input tool 100, the color adjuster 440 can put a color to the drawing output as if an actual color is painted on the paper.

If the display attribute of outputting the drawing is decided by the display attribute determiner 223, the drawing control unit 224 outputs a drawing to the interface unit 210 corresponding to the decided display attribute and a drawing pattern of the proximity input.

The drawing pattern of proximity input denotes a shape of the drawing intended by a user such as a character, a symbol, a picture, and a gesture. The drawing control unit 224 provides a drawing output according the drawing pattern intended by the user and a more practical drawing sense when outputting the drawing according to the decided display attribute.

Figure 8:
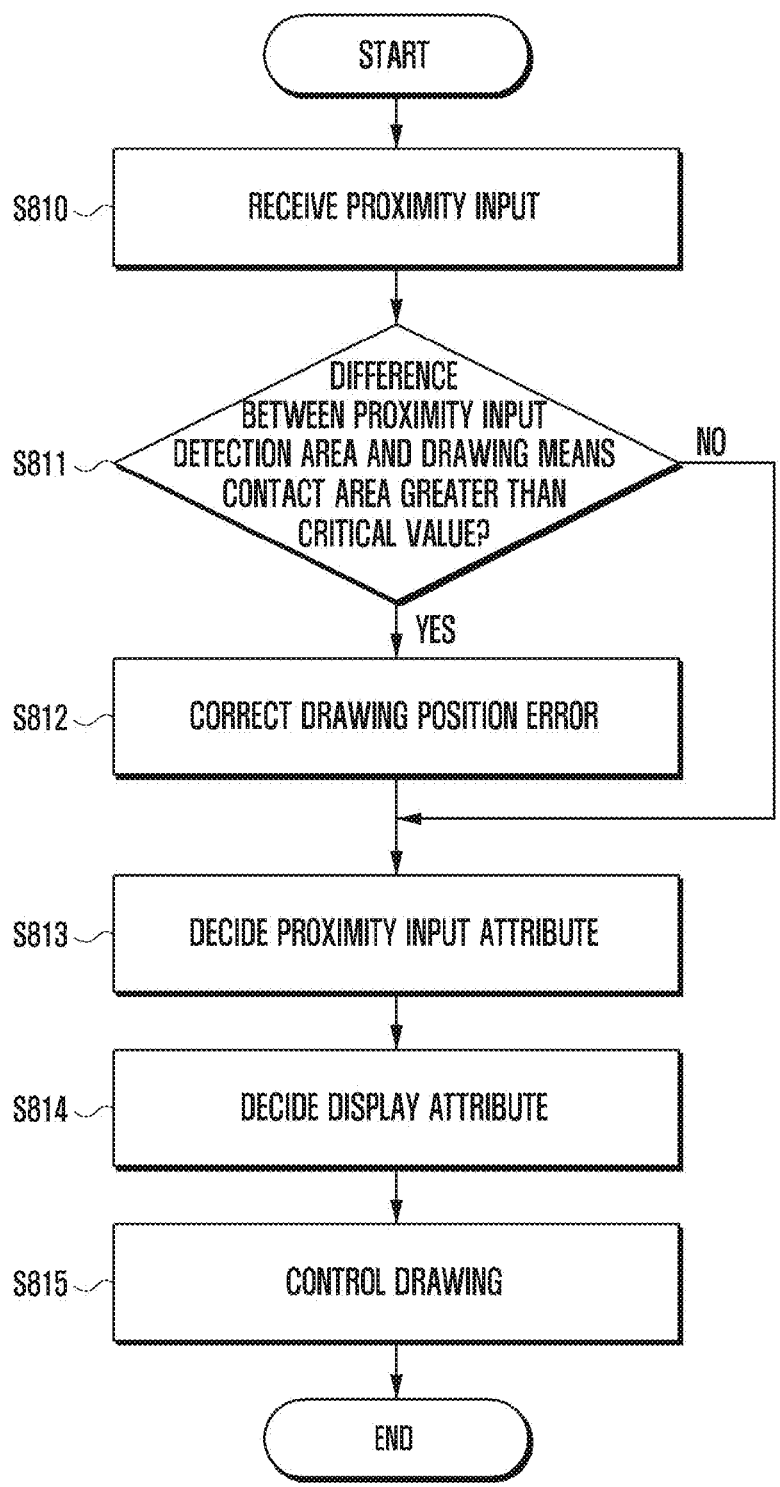
FIG. 8 is a flowchart illustrating an input procedure in an electronic device according to an embodiment of the present disclosure.

FIG. 8 is a flowchart illustrating an input procedure in an electronic device according to an embodiment of the present disclosure.

The electronic device can execute an application to receive a drawing input. Of course, a waiting screen and other various screens can be set to receive a drawing input.

If the state of receiving a drawing input is ready, the electronic device receives a proximity input from the input tool 100 at operation S810. The proximity input can be a drawing input performed by the electronic device.

The electronic device identifies whether an area of detected proximity input on the user interface is identical to an actual area of contacted drawing means of an input tool at operation S811. This is to compensate a deviation between a drawing location intended by a user on the user interface and a drawing location identified by the drawing means.

If the area of detected proximity input on the user interface is identical to the actual area of the contacted drawing means of the input tool, the compensation of the deviation is unnecessary. If the area of the detected proximity input on the user interface is different from the actual area of the contacted drawing means of the input tool, the drawing location can be compensated by detecting the deviation at operation S812. The method of compensating the deviation of drawing location has already been described herein. Operations S811 and S812 of detecting and compensating the deviation of the drawing location are not essential to perform a drawing input in the electronic device, and may be performed selectively.

The electronic device identifies the attribute of the proximity input received from the user interface at operation S813. Because the attribute of the proximity input changes at every moment, the attribute of the received proximity input is identified in real time.

Subsequently, the display attribute of outputting the drawing is decided based on the attribute of the identified proximity input at operation S814. Here, the attribute of the identified proximity input may be tuned with a value modeled on an actual drawing means and may be decided with the attribute of a tuned proximity input.

The electronic device outputs a drawing to the user interface corresponding to the decided display attribute of the outputting of the drawing and a drawing pattern of the proximity input at operation S815. The electronic device can provide an output drawing intended by a user and a more practical drawing sense according to the decided display attribute.

According to various embodiments of the present disclosure, more intuitive and practical drawing can be achieved by using an input tool on a user interface of an electronic device. Further, a user environment for an optimum drawing sense can be provided.

According to various embodiments, at least part of a device (for example, modules or functions thereof) or a method (for example, operations) according to the various embodiments of the present disclosure may be embodied by, for example, one or more instructions stored in a non-transitory computer readable storage medium provided in a form of a programming module. When the command is executed by one or more processors (for example, control unit 220), the one or more processors may perform a function corresponding to the command. At least a part of the programming module may be implemented (for example, executed) by, for example, the control unit 220. At least a part of the programming module may include, for example, a module, a program, a routine, a set of instructions, and/or a process for performing one or more functions.

The non-transitory computer readable recording medium may include magnetic media such as a hard disk, a floppy disk, and a magnetic tape, optical media such as a Compact Disc Read Only Memory (CD-ROM) and a DVD, magneto-optical media such as a floptical disk, and hardware devices specially configured to store and perform a program instruction (for example, programming module), such as a Read Only Memory (ROM), a Random Access Memory (RAM), a flash memory and the like.

Further, the program commands may include high class language codes that can be executed in a computer by using an interpreter, as well as machine language codes that are made by a compiler. The aforementioned hardware device may be configured to operate as one or more software modules in order to perform the operation of the present disclosure, and vice versa. A programming module according to the present disclosure may include at least one of the described component elements, a few of the component elements may be omitted, or additional component elements may be included. Operations executed by a module, a programming module, or other component elements according to various embodiments of the present disclosure may be executed sequentially, in parallel, repeatedly, or in a heuristic manner. Also, a few operations may be executed based on a different order, may be omitted, or may additionally include another operation.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for inputting in an electronic device with a touch input and a proximity input, the method comprising:
  receiving a touch input and a proximity input provided by an input tool through a user interface, the input tool having a proximity input part for providing a proximity input and a drawing end with a predetermined length for providing a touch input;
  identifying an attribute of the received proximity input related to an inclination of the input tool;
  determining a display attribute based on the identified attribute of the proximity input; and
  outputting a drawing on the user interface according to the determined display attribute and a drawing input of the input tool,
  wherein the outputting of the drawing comprises:
    outputting the drawing according to the determined display attribute including a color, a thickness, and a shade at a location on the user interface, the color being adjusted based on a distance between the input tool and a display of the electronic device, and the thickness and the shade being determined based on the inclination of the input tool and a direction of movement of the input tool.

2. The method of claim 1, wherein the outputting of the drawing comprises:
  outputting the drawing with the thickness and the shade at the location on the user interface, when a first range of receiving the proximity input from the proximity input part of the input tool is different from a second range designated by the drawing end of the input tool.

3. The method of claim 1, further comprising:
  providing the user interface with a guide for the drawing output, if a proximity distance of the received proximity input is longer than the predetermined length of the drawing end.

4. The method of claim 1,
  wherein the attribute of the proximity input includes at least one of a proximity distance, a movement speed, an input duration time, a movement direction, a number of inputs, a standstill time of the proximity input, a state of the input tool, a type of drawing input associated with the drawing end, and a surface material virtually set to the user interface, and
  wherein the display attribute includes at least one of a thickness of the drawing, a dry brush effect, a shade, and a color.

5. The method of claim 4, wherein the determining of the display attribute comprises at least one of:
  adjusting the thickness of the drawing based on at least one of the identified proximity distance of the proximity input and the type of drawing input; or
  non-linearly adjusting the thickness of the drawing based on the proximity distance of the proximity input.

6. The method of claim 4, wherein the determining of the display attribute comprises adjusting the dry brush effect of the drawing based on at least one of a movement speed, an input duration time, a movement direction of the proximity input, and a type of drawing input.

7. The method of claim 4, wherein the determining of the display attribute comprises adjusting the shade of the drawing based on at least one of a number of inputs, a movement direction, a standstill time of the proximity input, and a surface material virtually set to the user interface.

8. The method of claim 4, wherein the determining of the display attribute comprises selecting the color of the drawing based on at least one of a user setting, a proximity distance of the proximity input, a state of the drawing end, and colors virtually set to the drawing end of the input tool.

9. The method of claim 8, wherein the selecting of the color is performed by contacting the drawing end of the input tool corresponding to a pallet including at least one color provided on the user interface.

10. A system for inputting in an electronic device with a touch input and a proximity input, the system comprising:
an input tool comprising a proximity input part for providing a proximity input and a drawing end providing a touch input with a predetermined length; and
the electronic device comprising:
a display,
a user interface, and
a control unit configured to:
receive a proximity input provided by the input tool through the user interface, to identify an attribute of the received proximity input related to an inclination of the input tool, and
output a drawing according to a display attribute including a color, a thickness, and a shade at a location on the user interface, the color being adjusted based on a distance between the input tool and the display, and the thickness and the shade being determined based on the inclination of the input tool and a direction of movement of the input tool.

11. The system of claim 10, wherein the control unit is configured to output the drawing with the thickness and the shade on the user interface, when a first range of receiving the proximity input from the proximity input part of the input tool is different from a second range designated by the drawing end of the input tool.

12. The system of claim 10, wherein the control unit provides the user interface with a guide for the drawing output, if a proximity distance of the received proximity input is longer than the predetermined length of the drawing end.

13. The system of claim 10,
wherein the attribute of the proximity input includes at least one of a proximity distance, a movement speed, an input duration time, a movement direction, a number of inputs, a standstill time of the proximity input, a state of the input tool, a type of drawing input associated with the drawing end, and a surface material virtually set to the user interface, and
wherein the display attribute includes at least one of a broadness of the drawing, a dry brush effect, a shade, and a color.

14. The system of claim 13, wherein the control unit performs at least one of adjusting the thickness of the drawing based on at least one of the identified proximity distance of the proximity input and the type of drawing input, or non-linearly adjusts the thickness of the drawing based on the proximity distance of the proximity input.

15. The system of claim 13, wherein the control unit adjusts the dry brush effect of the drawing based on at least one of a movement speed, an input duration time, a movement direction of the proximity input, and a type of drawing input.

16. The system of claim 13, wherein the control unit adjusts the shade of the drawing based on at least one of a number of inputs, a movement direction, a standstill time of the proximity input, and a surface material set to the user interface.

17. The system of claim 13, wherein the control unit selects the color of the drawing based on at least one of a user setting, a proximity distance of the proximity input, a state of the drawing end, and colors virtually set to the drawing end of the input tool.

18. The system of claim 17, wherein the control unit provides a pallet including at least one color for the user interface, and sets at least one color to the drawing end of the input tool if the drawing end contacts the pallet.

19. An electronic device for a touch input and a proximity input, the electronic device comprising:
a display;
a user interface configured to receive the proximity input and the touch input from an input tool; and
a control unit configured to:
receive the proximity input provided by the input tool through the user interface,
identify an attribute of the received proximity input related to an inclination of the input tool, and
output a drawing according to a display attribute including a color, a thickness, and a shade at a location on the user interface, the color being adjusted based on a distance between the input tool and the display, and the thickness and the shade being determined based on the inclination of the input tool and a direction of movement of the input tool.

20. The electronic device of claim 19,
wherein the attribute of the proximity input includes at least one of a proximity distance, a movement speed, an input duration time, a number of inputs, a standstill time of the proximity input, a state of the input tool, a type of drawing input associated with the drawing end, and a surface material virtually set to the user interface, and
wherein the display attribute includes at least one of a dry brush effect, a shade, and a color.

21. The electronic device of claim 19, wherein the control unit is further configured to perform at least one of adjusting the thickness of the drawing based on at least one of the identified proximity distance of the proximity input and the type of drawing input, or non-linearly adjusting the thickness of the drawing based on the proximity distance of the proximity input.

22. The electronic device of claim 19, wherein the control unit is further configured to adjust the dry brush effect of the drawing based on at least one of a movement speed, an input duration time, a movement direction of the proximity input, and a type of drawing input.

23. The electronic device of claim 19, wherein the control unit is further configured to adjust the shade of the drawing based on at least one of a number of inputs, a standstill time of the proximity input, and a surface material set to the user interface.

* * * * *